June 2, 1942.   B. M. HARRISON   2,284,654
DISTANCE AND DEPTH MEASURING SYSTEM
Filed Oct. 20, 1938
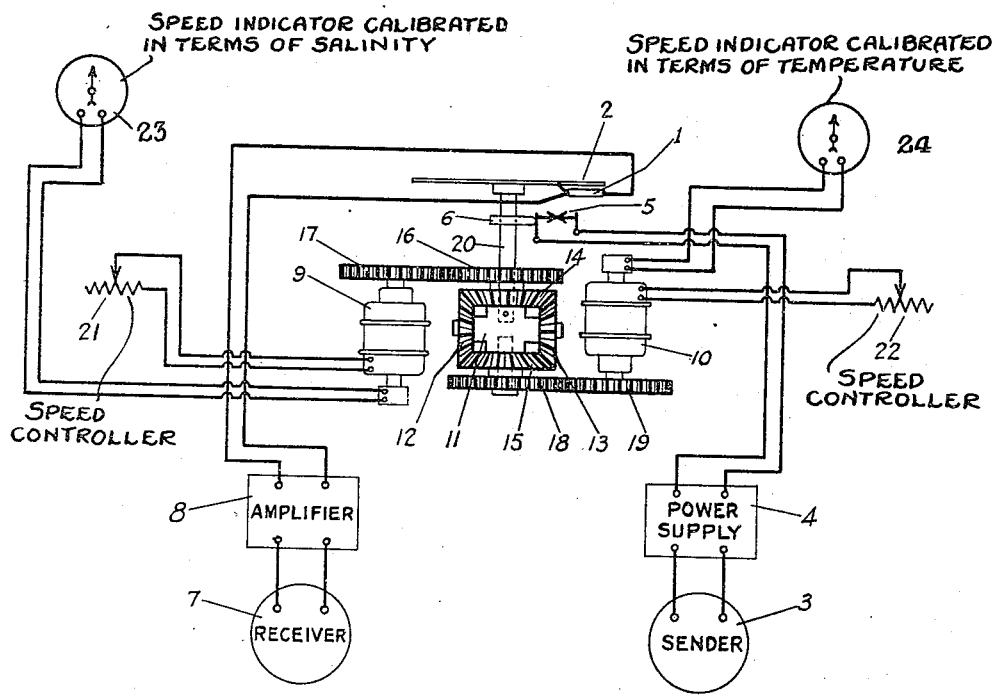
INVENTOR.
BERTRAM M. HARRISON
BY
ATTORNEY.

Patented June 2, 1942

2,284,654

UNITED STATES PATENT OFFICE 2,284,654

DISTANCE AND DEPTH MEASURING SYSTEM

Bertram M. Harrison, Newton Highlands, Mass., assignor to Submarine Signal Company, Boston, Mass., a corporation of Maine Application October 20, 1938, Serial No. 236,041

3 Claims. (Cl. 177—386)

The present invention relates to echo distance and depth measuring systems and particularly to an arrangement for controlling the speed of a rotating indicator in such systems with reference to the temperature and salinity of the signaling medium.

Echo depth and distance measuring systems have heretofore been used in which a compressional wave signal is transmitted, its echo received after reflection from a distant object, which may be the sea bottom, and the time interval measured between the transmission of the signal and the receipt of the echo. Measurement of this time interval is evidently a measure of the distance to the reflecting object and return. This, however, is true only under the assumption that the compressional wave travels through the water at a constant velocity. For most purposes this assumption does not cause any appreciable error. There are, however, instances where greater accuracy may be desired as, for example, in survey work, particularly in regions where relatively large temperature and salinity variations exist.

Echo distance and depth measuring systems most widely in use at the present time employ an indicator rotating at a constant speed which is a function of the average velocity of sound transmission through the water. The velocity of compressional waves in water is dependent upon the density of the water and the latter, in turn, varies with the temperature and the salinity in a well-known manner. Since the indicator speed is correct only for a given water density, it is evident that where the water density varies from the assumed standard, corrections in the readings of depth or distance must be made if close accuracy is desired. The making of such corrections may become very tedious particularly when a great many measurements are made as is the case in survey work. it is an object of the present invention to avoid the necessity for making such corrections.

A further object of the invention is to provide a means whereby the necessary corrections for the variation of compressional wave velocity in water with changes in temperature and salinity may be made without computation by the operator.

These and other objects of the present invention will be understood from the following description taken with reference to the accompanying drawing which shows a schematic diagram of the invention.

In the drawing an indicator 1 which may be a neon discharge tube is mounted on a disc 2 which is arranged to be rotated in front of a dial suitably calibrated in units of distance or depth. A sender 3 is used to transmit a compressional wave impulse to the water when supplied with power from power supply 4. The sender is preferably energized periodically each time the indicator 1 reaches a predetermined position. This may be accomplished, for instance, by means of the contacts 5 which are closed once in each revolution of the indicator 1 by means of a cam 6 which rotates at the same speed as the indicator 1. The reflected impulse may be picked up by a receiver 7 and amplified by an amplifier 8 through which it actuates the indicator 1 to produce a luminous discharge of the same.

Between the instant of transmission of the signal and the actuation of the indicator by the echo, the indicator 1 will have travelled through an angle which is proportional to the speed of the disc 2. This angle will be a measure of the distance or depth provided that the disc 2 is rotated at a velocity which corresponds to the density of the water through which the signal passed. As above mentioned, the density of the water varies with its temperature and salinity.

In order to provide a means whereby the speed of rotation of the indicator 1 may be corrected for varying conditions of water temperature and salinity, the disc 2 which carries the indicator is driven by two motors 9 and 10 through a differential gearing. This comprises a cross 11 upon which are rotatably mounted bevel gears 12 and 13 both of which mesh with the driving gears 14 and 15. The gear 14 is fixed to and rotatable with a gear 16 which is driven by the motor through the gear 17. The gear 15, on the other hand, is fixed to and rotates with gear 18 which is driven by the motor 10 through the gear 19. All the gears are freely rotatable with respect to the cross member 11. Fixed to the latter, however, is the shaft 20 which carries the indicator disc 2.

The motors 9 and 10 are supplied with power from a suitable source. The speed of the motor 9 may be adjusted by the device 21 which may, for example, be a rheostat in the motor field circuit or any other suitable arrangement. A similar speed control 22 is provided for the motor 10. The speeds of the two motors are respectively shown on the indicators 23 and 24 which may be in the form of vibrating reed frequency meters or other suitable speed indicators. One of the indicators, for example, 23, is calibrated directly in terms of water salinity while the other indicator 24 is calibrated in terms of water temperature.

It will now be evident to those skilled in the art that the disc 2 will be rotated by the differential at a speed which is equal to the difference between the speeds of the driving gears 14 and 15. This speed is chosen to correspond to the normal temperature and salinity conditions. If the salinity of the water varies from the normal, the operator will adjust the control 21 until the indicator 23 indicates the new salinity. If the change was one of increasing salinity, the water will have a greater density and the sound velocity will be greater. Consequently a sound impulse will travel to and from a reflecting object in a shorter time interval and it will be necessary for the indicator 1 to rotate with a higher velocity. The speed of the motor 9 must, therefore, be changed in such a direction as to increase the difference between its speed and that of the motor 10. For a decrease in salinity the reverse, of course, is true. Thus, the indicator 23 will be calibrated to show increasing salinity with increasing motor speed and vice versa provided that the motor 9 was originally running at the higher speed.

On the other hand, if a variation in water temperature is observed, the device 22 is adjusted by the operator until the indicator 24 shows the observed temperature. If the temperature has increased, the water density will be less and the sound velocity also less so that the indicator 1 must move at a lower speed. The speed of the motor 10 must under these circumstances, therefore, be changed to decrease the difference between its speed and that of motor 9. If motor 10 has normally a lower speed than motor 9, the indicator 24 will therefore be calibrated to show increasing temperature for increasing motor speed. It will be evident that by means of these adjustments correct measurements can be made which will not require subsequent corrections regardless of the temperature or salinity conditions which may be encountered.

Having now described my invention, I claim:

1. Apparatus for measuring sea distances and depths under water comprising a rotating indicator, means for transmitting a compressional wave impulse at a predetermined position of said indicator, means for receiving the echo of said impulse reflected from the object whose distance is being measured, means for causing said echo to operate said indicator and two independently adjustable means controlled by the operator for varying the speed of rotation of said indicator, one in accordance with known variations in water salinity and the other in accordance with known variation in temperature.

2. In a salt water echo distance measuring system, in combination, a rotatable indicator, and means for rotating the indicator including adjustable means controlled by the operator for providing predetermined variations in rotational speed corresponding to known variations in water temperature and a second adjustable means controlled by the operator for providing predetermined variations in rotational speed corresponding to known variations in water salinity.

3. An apparatus for salt water echo distance measurement comprising a rotatable indicator, means for transmitting a compressional wave energy impulse at a predetermined position of said indicator, means for receiving the echo of said impulse reflected from the object whose distance is being measured, means for causing said echo to operate said indicator, means for rotating the indicator including a differential gearing, two motors for driving opposite sides of said differential, means controlled by the operator for separately adjusting the speeds of each of said motors and means for indicating the speeds of each of said motors, said indicators being calibrated in terms of salinity and temperature respectively, thereby showing when the motors' speeds have been adjusted to the correct values for given conditions of salinity and temperature.

BERTRAM M. HARRISON.